United States Patent
Chai et al.

(10) Patent No.: US 12,515,260 B2
(45) Date of Patent: Jan. 6, 2026

(54) CLAMPING MECHANISM AND ELECTRIC TOOL

(71) Applicants: SHANDONG WEIDA MACHINERY CO., LTD., Shandong (CN); TECHTRONIC CORDLESS GP, Anderson, SC (US)

(72) Inventors: Haolin Chai, Shandong (CN); Peng Lin, Shandong (CN); Jixiang Zhang, Shandong (CN); Longlong Hu, Shandong (CN); Ziying Wang, Shandong (CN)

(73) Assignees: SHANDONG WEIDA MACHINERY CO., LTD., Shandong (CN); TECHTRONIC CORDLESS GP, Anderson, SC (US)

( * ) Notice: Subject to any disclaimer, the term of this patent is extended or adjusted under 35 U.S.C. 154(b) by 94 days.

(21) Appl. No.: 18/293,974

(22) PCT Filed: Aug. 23, 2022

(86) PCT No.: PCT/CN2022/114262
§ 371 (c)(1),
(2) Date: Jan. 31, 2024

(87) PCT Pub. No.: WO2023/025148
PCT Pub. Date: Mar. 2, 2023

(65) Prior Publication Data
US 2025/0073846 A1  Mar. 6, 2025

(30) Foreign Application Priority Data

Aug. 24, 2021 (CN) .......................... 202110977259.1
Aug. 24, 2021 (CN) .......................... 202122008295.5

(51) Int. Cl.
*B23B 31/20* (2006.01)
*F16D 41/18* (2006.01)

(52) U.S. Cl.
CPC .... *B23B 31/2072* (2021.01); *B23B 2260/044* (2013.01); *F16D 41/185* (2013.01)

(58) Field of Classification Search
CPC ......... B23B 2260/044–0445; B23B 2260/084; F16D 41/18–185
See application file for complete search history.

(56) References Cited

U.S. PATENT DOCUMENTS 5,031,925 A    7/1991  Tatsu
5,174,588 A *  12/1992 Reibetanz ........... B23B 31/1238
                                                279/140
(Continued)

FOREIGN PATENT DOCUMENTS

CN    106424861 A    2/2017
CN    107414745 A    12/2017
(Continued)

OTHER PUBLICATIONS

The First Search Report of the counterpart priority CN patent application No. 202110977259.1 issued on May 19, 2025.
(Continued)

*Primary Examiner* — James J Taylor, II
(74) *Attorney, Agent, or Firm* — The Sun IP Law

(57) ABSTRACT

Disclosed are a clamping mechanism and an electric tool. The clamping mechanism includes a main body, a locking cap, a spring chuck and an outer sleeve which is sleeved on a periphery of the locking cap and is configured to drive the locking cap to rotate, wherein the spring chuck includes at least two spring claws; the locking cap is connected with the main body, and the locking cap is able to move in a direction close to the main body, or move in a direction away from the
(Continued)

main body, so that the spring claws are loosened; a ring piece is arranged at an end, close to the main body, of the locking cap, and an elastic piece is arranged between the ring piece and the locking cap; a first groove is arranged on an inner wall of the outer sleeve, and a cam block.

20 Claims, 5 Drawing Sheets

(56) References Cited

U.S. PATENT DOCUMENTS

| | | | |
|---|---|---|---|
| 5,407,215 A | 4/1995 | Yang | |
| 6,409,181 B1* | 6/2002 | Hsueh | B23B 31/1238 279/140 |
| 8,403,339 B2* | 3/2013 | Yaksich | B23B 31/16 279/140 |
| 2022/0118528 A1* | 4/2022 | Liu | B23B 31/1246 |

FOREIGN PATENT DOCUMENTS

| | | |
|---|---|---|
| CN | 207953376 U | 10/2018 |
| CN | 109940200 A | 6/2019 |
| CN | 211491358 U | 9/2020 |
| CN | 215588836 U | 1/2022 |
| DE | 102009025487 A1 | 1/2010 |
| DE | 102017009450 A1 | 5/2018 |
| EP | 1449607 A1 | 8/2004 |
| TW | 431238 U | 4/2001 |
| WO | 2020113703 A1 | 6/2020 |

OTHER PUBLICATIONS

The Extend Search Report of counterpart EP application No. 22860494.8 issued on Jun. 5, 2025.

* cited by examiner

CLAMPING MECHANISM AND ELECTRIC TOOL

CROSS-REFERENCE TO RELATED APPLICATION

The present disclosure claims priority to Chinese patent application No. 202122008295.5, filed to the China National Intellectual Property Administration on Aug. 24, 2021 and entitled "Clamping Mechanism and Electric Tool", and Chinese patent application No. 202110977259.1, filed to the China National Intellectual Property Administration on Aug. 24, 2021 and entitled "Clamping Mechanism and Electric Tool", the disclosures of which are hereby incorporated by reference in their entirety.

TECHNICAL FIELD

The present disclosure relates to a technical field of clamping mechanisms, and in particular to a clamping mechanism with reliable locking and an electric tool.

BACKGROUND

Electric tools, such as electric grinding tools, are widely used in people's lives to complete tasks such as grinding, polishing and engraving.

The electric tool usually includes a main machine, an electric grinding head and a clamping mechanism. The clamping mechanism is configured to connect the electric grinding head and the main machine, so that the main machine may complete the tasks such as grinding and polishing. However, due to a high speed at which the electric grinding head rotates during operation, potential safety hazards are caused by the fact that a danger occurs easily if the clamping between the electric grinding head and the main machine becomes loose during operation.

SUMMARY

(1) Technical Problem to be Solved

The technical problem to be solved in some embodiments of the present disclosure is to solve the problem of potential safety hazards caused by the fact that a danger occurs easily if the clamping between an existing electric grinding head and a main machine becomes loose.

(2) Technical Solution

In order to solve the above technical problem, embodiments of the present disclosure provide a clamping mechanism, which includes a main body, a locking cap, a spring chuck and an outer sleeve which is sleeved on a periphery of the locking cap and is configured to drive the locking cap to rotate.

The spring chuck includes at least two spring claws which are circumferentially arranged to form a clamping claw hole. The locking cap is connected with the main body, and the locking cap is able to move in a direction close to the main body, so that the at least two spring claws are close to each other under a pressing action of an inner wall of the locking cap to achieve clamping, or move in a direction away from the main body, so that the spring claws are loosened.

A ring piece is arranged at an end, close to the main body, of the locking cap, and an elastic piece is arranged between the ring piece and the locking cap. A first groove is arranged on an inner wall of the outer sleeve, and a cam block cooperating with the first groove is arranged on the ring piece. When the cam block is rotated into the first groove, the ring piece cooperates with the main body under an action of the elastic piece to limit a rotation of the locking cap relative to the main body in a direction of the loosening of the spring claws when the spring claws are clamped, and when the cam block is moved out of the first groove, the ring piece is disengaged from the main body.

According to an embodiment of the present disclosure, a first locking part is formed on the ring piece, a second locking part is formed on the main body, and the second locking part is configured to cooperate with the first locking part to limit the rotation of the locking cap relative to the main body in the direction of the loosening of the spring claws in a clamping state of the spring claws.

According to an embodiment of the present disclosure, a ratchet is arranged on the ring piece, the ratchet is formed as the first locking part, and the second locking part is engaging teeth arranged on the main body and configured to engage with the ratchet.

According to an embodiment of the present disclosure, a second groove is further arranged on the inner wall of the outer sleeve, the second groove is adjacent to the first groove, a groove depth of the second groove is less than a groove depth of the first groove, when the cam block is rotated from the second groove into the first groove, the ratchet is engaged with the engaging teeth, and when the cam block is rotated from the first groove into the second groove, the ratchet is disengaged from the engaging teeth.

According to an embodiment of the present disclosure, at least one first driving part is arranged on the outer sleeve, at least one second driving part is arranged on the locking cap, and the first driving part is in driving connection with the second driving part to drive the locking cap to rotate when rotating the outer sleeve.

According to an embodiment of the present disclosure, each first driving part comprises a driving strip, each second driving part comprises a driving groove, the driving strip is able to extend into the driving groove and is in clearance fit with the driving groove, and a gap corresponds to an angle at which the ring piece is rotated from being combined with the main body to being disengaged from the main body.

According to an embodiment of the present disclosure, at least two first driving parts are provided, the at least two first driving parts are arranged at intervals in a circumferential direction of the inner wall of the outer sleeve, and the first groove and the second groove are located between two adjacent first driving parts.

According to an embodiment of the present disclosure, first clamping parts are arranged on an inner wall of the ring piece, and second clamping parts configured to cooperate with the first clamping parts are arranged on the locking cap, so that the ring piece and the locking cap are relatively fixed in a circumferential direction and may relatively move in an axial direction.

According to an embodiment of the present disclosure, a first conical surface is arranged on an outer wall surface of an end, close to the locking cap, of each spring claw, and a second conical surface cooperating with the first conical surface is formed on the inner wall of the locking cap.

According to an embodiment of the present disclosure, a first positioning surface is arranged on an outer wall surface of an end, close to the main body, of each spring claw, and a second positioning surface cooperating with the first positioning surface is formed on an inner wall of the main body.

According to an embodiment of the present disclosure, a first thread is arranged on an outer wall of the main body, a second thread engaged with the first thread is arranged on an inner wall of the locking cap, and the main body and the locking cap are connected through an engagement between the first thread and the second thread.

In a second aspect, an embodiment of the present disclosure further provides an electric tool, including a main machine, a clamping piece and the above clamping mechanism, the main machine and the clamping piece being connected through the clamping mechanism.

(3) Beneficial Effect

Compared with an art known to inventors, the technical solution provided by the embodiments of the present disclosure has the following advantages.

The present disclosure provides the clamping mechanism and the electric tool. The clamping mechanism includes the main body, the locking cap, the spring chuck and the outer sleeve which is sleeved on the periphery of the locking cap and may drive the locking cap to rotate. The spring claws of the spring chuck are circumferentially arranged to form the clamping claw hole for clamping the clamping piece connected to the electric tool. The locking cap is connected with the main body, and the locking cap is configured to move in the direction close to the main body, so that the at least two spring claws are close to each other under the pressing action of the inner wall of the locking cap to reduce an aperture of the clamping claw hole to achieve clamping, or move in the direction away from the main body, so that the locking cap releases the pressing effect on the spring claws, and then the aperture of the clamping claw hole is enlarged to release or loosen the spring claws. The ring piece is arranged at an end, close to the main body, of the locking cap, and the elastic piece is arranged between the ring piece and the locking cap. The first groove is arranged on the inner wall of the outer sleeve, and the cam block cooperating with the first groove is arranged on the ring piece. When the cam block is rotated into the first groove, the ring piece cooperates with the main body under the action of the elastic piece to limit the rotation of the locking cap relative to the main body in the direction of the loosening of the spring claws in the clamping state of the spring claws, so that the problem of potential safety hazards caused by the fact that the clamping becomes loose during operation of the clamping mechanism is avoided.

It is to be understood that the above general description and the following detailed description are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the embodiments of the present disclosure or the technical solutions in the related art, the accompanying drawings used in the description of the embodiments or the related art will be briefly described below. It is apparent that other accompanying drawings may further be obtained by those of ordinary skill in the art according to these accompanying drawings without creative efforts.

DETAILED DESCRIPTION OF THE EMBODIMENTS

Figure 1:
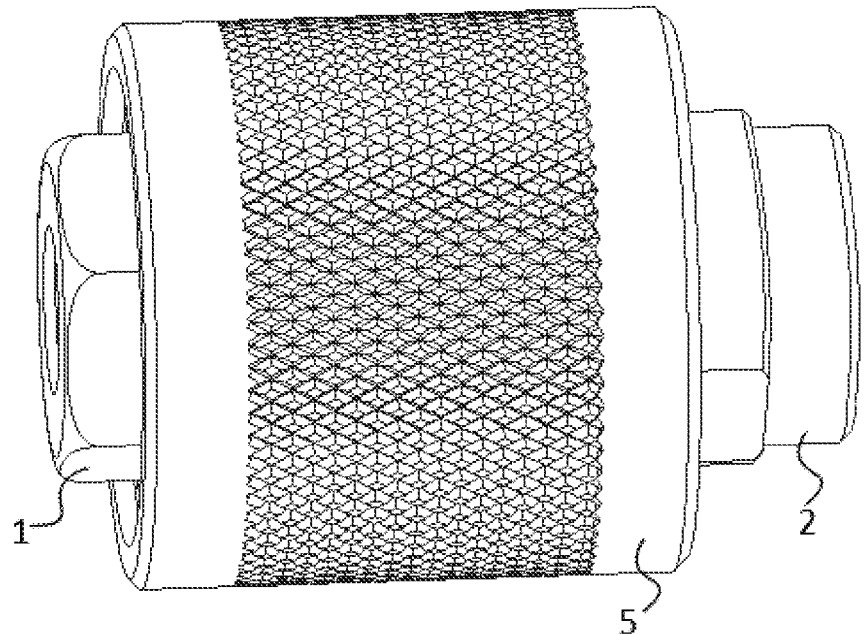
FIG. 1 is a three-dimensional diagram of a clamping mechanism according to an embodiment of the present disclosure.

In order to make objectives, technical solutions, and advantages of embodiments of the present disclosure clearer, the technical solutions in the embodiments of the present disclosure will be clearly and completely described below. It is apparent that the described embodiments are only part of the embodiments of the present disclosure, not all the embodiments. All other embodiments obtained by those of ordinary skill in the art on the basis of the embodiments in the present disclosure without creative work shall fall within the scope of protection of the present disclosure.

Embodiment 1

As shown in FIG. 1 to FIG. 8, some embodiments of the present disclosure provide a clamping mechanism. The clamping mechanism includes a main body 1, a locking cap 2, a spring chuck 3 and an outer sleeve 5 which is sleeved on a periphery of the locking cap 2 and is able to drive the locking cap 2 to rotate.

The spring chuck 3 includes a chuck rod 31 located in the main body 1 and at least two spring claws 32 connected with the chuck rod 31. The at least two spring claws 32 are located in the locking cap 2 and arranged at intervals in a circumferential direction of the chuck rod 31, so as to be circumferentially arranged to form a clamping claw hole 33 for clamping a clamping piece of an electric tool. Specifically, the main body 1 and the locking cap 2 are of hollow structures with openings at both ends. The chuck rod 31 is located in a cavity of the main body 1, and the spring claws 32 are located in a cavity of the locking cap 2.

It is understandable that a gap or an opening is arranged between the adjacent spring claws 32, so that the plurality of spring claws 32 may move in a direction close to each other under an action of an external pressing force to clamp the clamping piece, or the plurality of spring claws 32 may move in a direction away from each other, so that the spring claws 32 are opened to release or loosen the clamping piece.

The clamping piece may be, for example, an electric grinding head or other components that need to be clamped.

The locking cap 2 is connected with the main body 1, and the locking cap 2 may move in a direction close to the main body 1, so that the at least two spring claws 32 are close to each other under a pressing action of an inner wall of the locking cap 2 to reduce an aperture of the clamping claw hole 33 to clamp the clamping piece. The locking cap 2 may also move in a direction away from the main body 1, so that the locking cap 2 releases the pressing action on the spring claws 32, and then the aperture of the clamping claw hole 33 is enlarged to release or loosen the clamping piece.

In an embodiment, a first thread 11 is arranged on an outer wall of the main body 1, a second thread 21 is arranged on an inner wall of the locking cap 2, and the main body 1 and the locking cap 2 are in threaded connection through an engagement between the first thread 11 and the second thread 21.

In an embodiment, a ring piece 4 is arranged at an end, close to the main body 1, of the locking cap 2, and an elastic piece 6 is arranged between the ring piece 4 and the locking cap 2. Wherein, the elastic piece 6 may be an elastic pad or an elastic ring, etc. A first groove 52 is arranged on an inner wall of the outer sleeve 5, and a cam block 44 cooperating with the first groove 52 is arranged on the ring piece 4. When the cam block 44 is rotated into the first groove 52, the ring piece 4 cooperates with the main body 1 under an action of the elastic piece 6, so as to prevent the locking cap 2 from rotating relative to the main body 1 in a direction of the loosening of the spring claws 32 in a clamping state of the spring claws 32, and when the cam block 44 is moved out of the first groove 52, the ring piece 4 is disengaged from the main body 1 to release the locking.

As shown in FIG. 1 to FIG. 3 and FIG. 6, the outer sleeve 5 is in driving connection with the locking cap 2, so that the locking cap 2 is driven to rotate by rotating the outer sleeve 5 at a certain angle. Exemplarily, in specific use, after the outer sleeve 5 is rotated forward to a certain angle, the locking cap 2 may be driven by the outer sleeve 5 in the direction close to the main body 1, so that the spring claws 32 are in the clamping state, and at this time, the cam block 44 is rotated into the first groove 52, so that the ring piece 4 cooperates with the main body 1. After the elastic piece 6 is compressed between the ring piece 4 and the locking cap 2, an elastic recovery force may be provided for the ring piece 4 to push the ring piece 4 towards the main body 1, so as to ensure that the ring piece 4 cooperates with the main body 1 to achieve locking, and the spring claws 32 are not loosened. After the outer sleeve 5 is rotated reversely to a certain angle, the cam block 44 is rotated out of the first groove 52, so that the ring piece 4 is disengaged from the main body 1. The locking cap 2 may be driven by the outer sleeve 5 to move in the direction away from the main body 1, so that the spring claws 32 are in a loosened state.

Figure 7:
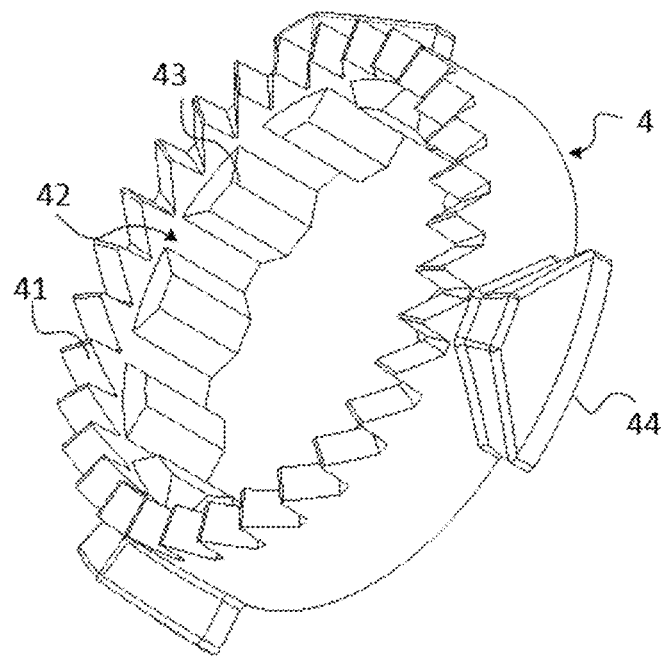
FIG. 7 is a schematic structural diagram of a ring piece of a clamping mechanism according to an embodiment of the present disclosure.

In some embodiments, a first locking part is formed on the ring piece 4, a second locking part is formed on the main body 1, and the second locking part is configured to cooperate with the first locking part to limit the rotation of the locking cap 2 relative to the main body 1 in the direction of the loosening of the spring claws 32 in the clamping state of the spring claws 32. Referring to FIG. 7, a ratchet 41 is arranged on the ring piece 4, the ratchet 41 is formed as the first locking part, and the second locking part is engaging teeth 12 arranged on the main body 1.

When the locking cap 2 moves in the direction close to the main body 1 to clamp the clamping claw hole 33, the ratchet 41 on the ring piece 4 is engaged with the engaging teeth 12 on the main body 1. Due to the one-way check action of the ratchet 41, the ratchet 41 may only be rotated in the direction of clamping the spring claws 32 relative to the main body 1, but may not be rotated reversely, so that reliable locking is achieved to ensure that the spring claws 32 are not loosened when clamping the electric grinding head, thereby avoiding a potential safety hazards caused by disengagement or looseness between the two. When the locking cap 2 moves in the direction away from the main body 1, the ratchet 41 is disengaged with the engaging teeth 12, thereby allowing the locking cap 2 to rotate in the direction of the loosening of the spring claws 32 to cause the spring claws 32 to loosen or release the electric grinding head.

Figure 6:
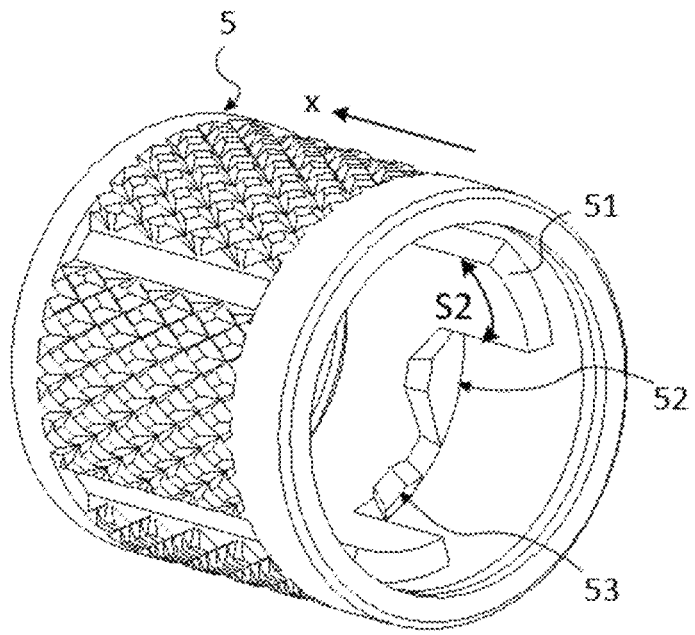
FIG. 6 is a schematic structural diagram of an outer sleeve of a clamping mechanism according to an embodiment of the present disclosure.
Figure 8:
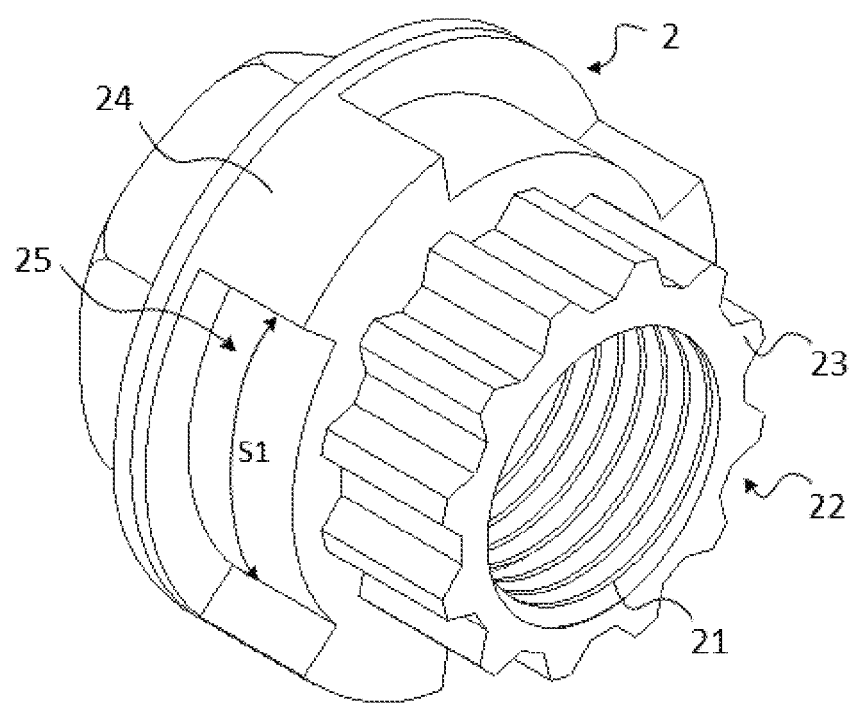
FIG. 8 is a schematic structural diagram of a locking cap of a clamping mechanism according to an embodiment of the present disclosure.

As shown in FIG. 6 and FIG. 8, in some embodiments, a second groove 53 is further arranged on the inner wall of the outer sleeve 5, the second groove 53 is adjacent to the first groove 52, a groove depth (that is, the size of the second groove 53 in an x direction in FIG. 6) of the second groove 53 is less than a groove depth (that is, the size of the first groove 52 in the x direction in FIG. 6) of the first groove 52, so that when the cam block 44 is rotated from the second groove 53 into the first groove 52, the ratchet 41 is engaged with the engaging teeth 12, and when the cam block 44 is rotated from the first groove 52 into the second groove 53, the ratchet 41 is disengaged from the engaging teeth 12. Through the arrangement of the second groove 53, a positioning of the ring piece 4 is more reliable when the ring piece 4 is disengaged from the main body 1. It is to be noted that the second groove 53 may also not be arranged, the outer sleeve 5 only needs to be provided with a structural height difference causing the ring piece 4 to be disengaged from the main body 1 when the cam block 44 is rotated out of the first groove 52.

As shown in FIG. 6 and FIG. 8, in some embodiments, at least one first driving part is arranged on the outer sleeve 5, at least one second driving part is arranged on the locking cap 2, and each first driving part is in driving connection with a corresponding second driving part to drive the locking cap 2 to rotate when rotating the outer sleeve 5. The first driving part is a driving strip 51, the second driving part is a driving groove 25, and the driving strip 51 may extend into the driving groove 25 and are in clearance fit with the driving groove 25. That is, an arc length S1 of the driving groove 25 in a circumferential direction of the locking cap 2 is greater than an arc length S2 of the driving strip 51 in a circumferential direction of the outer sleeve 5, and a gap between the arc lengths of the two corresponds to an angle at which the ring piece 4 is rotated from being combined with the main body 1 to being disengaged from the main body 1. In some embodiments, driving tables 24 are formed on a periphery of the locking cap 2, and the driving groove 25 is formed between two adjacent driving tables 24.

In some embodiments, at least two driving strips 51 are provided, the at least two driving strips 51 are arranged at intervals in the circumferential direction of the outer sleeve 5. Accordingly, at least two driving grooves 25 are provided, and one driving groove 25 corresponds to one driving strip 51. The first groove 52 and the second groove 53 are located between the two adjacent driving strips 51.

As shown in FIG. 7 and FIG. 8, in some embodiments, first clamping parts are arranged on an inner wall of the ring piece 4, and second clamping parts cooperating with the first clamping parts are formed on the locking cap 2, so that when the first clamping parts are clamped in the second clamping parts, the ring piece 4 and the locking cap 2 are relatively fixed in a circumferential direction and may relatively move in an axial direction.

In a specific implementation, the first clamping parts are first keyways 42, a first boss 43 is formed between adjacent first keyways 42, the second clamping parts are second bosses 23, and a second keyway 22 is formed between the adjacent second bosses 23, so that the second bosses 23 may be clamped in the first keyways 42, and then the ring piece 4 and the locking cap 2 are relatively fixed in the circumferential direction and may relatively move in the axial direction.

Figure 2:
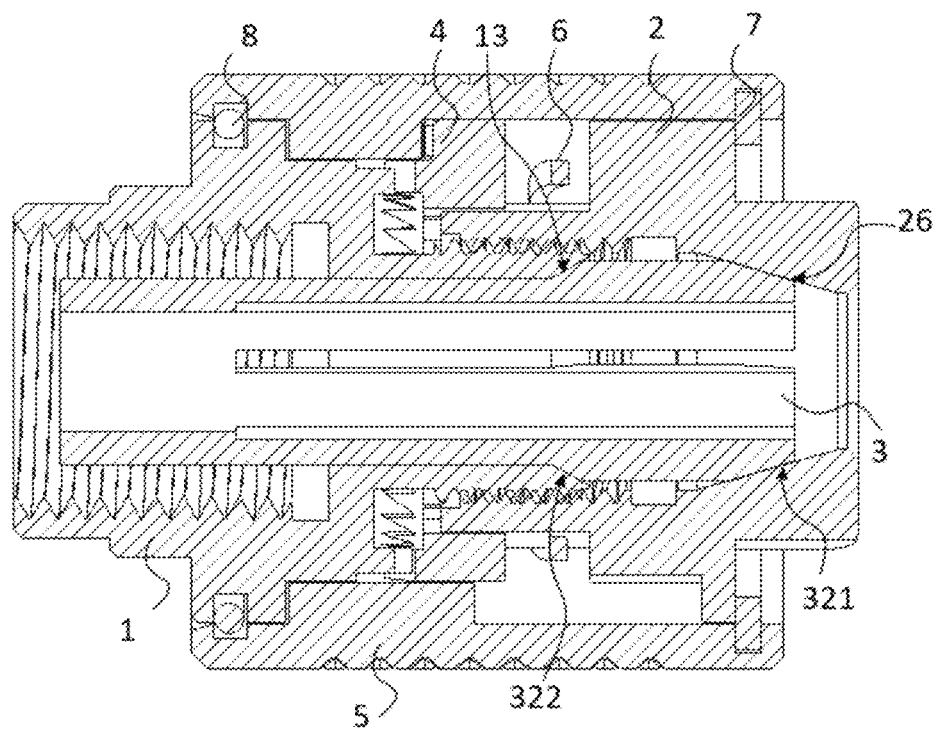
FIG. 2 is a schematic diagram of an internal structure of a clamping mechanism according to an embodiment of the present disclosure.
Figure 3:
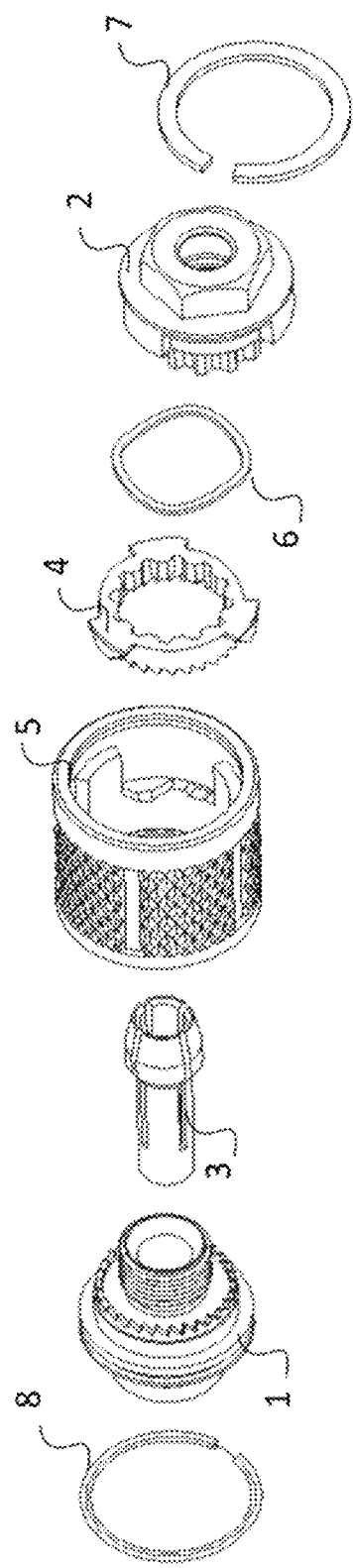
FIG. 3 is a schematic diagram of a decomposition structure of a clamping mechanism according to an embodiment of the present disclosure.
Figure 5:
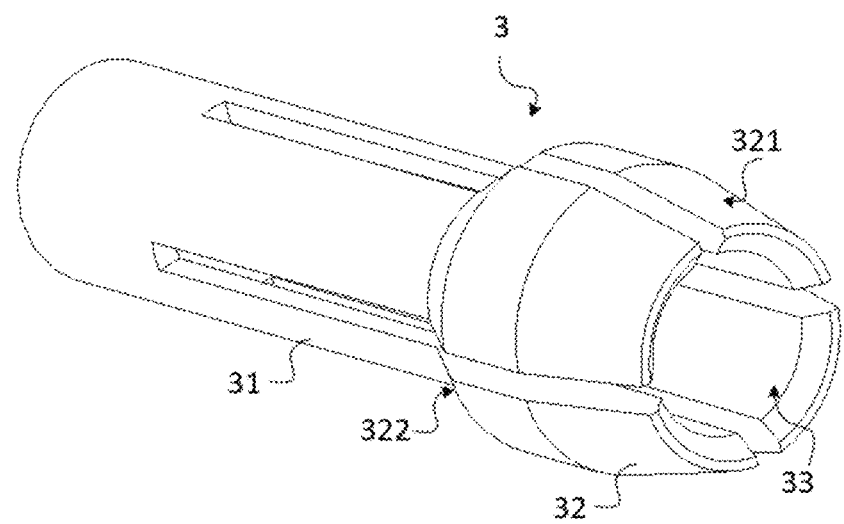
FIG. 5 is a schematic structural diagram of a spring chuck of a clamping mechanism according to an embodiment of the present disclosure.

As shown in FIG. 2 and FIG. 5, in some embodiments, a first conical surface 321 is arranged on an outer wall surface of an end, close to the locking cap 2, of each spring claw 32, and a second conical surface 26 cooperating with the first conical surface 321 is formed on the inner wall of the locking cap 2. Specifically, in a direction from the chuck rod 31 to the spring claw 32, the first conical surface 321 is obliquely arranged in a direction close to a central axis of the chuck rod 31. When the locking cap 2 moves in the direction close to the main body 1, the second conical surface 26 of the locking cap 2 presses the first conical surface 321 of the each spring claw 32, so that the spring claws 32 clamp the electric grinding head. Conversely, when the locking cap 2 moves in the direction away from the main body 1, the spring claws 32 loosen the electric grinding head.

Figure 4:
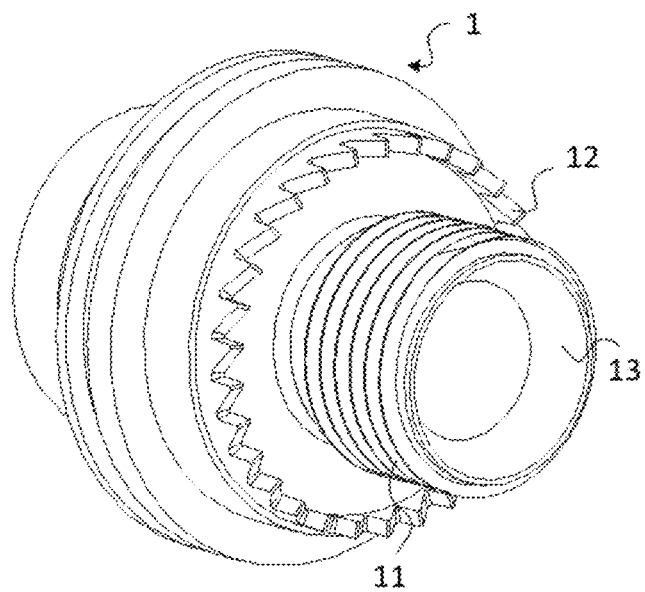
FIG. 4 is a schematic structural diagram of a main body of a clamping mechanism according to an embodiment of the present disclosure.

As shown in FIG. 2 and FIG. 4, a first positioning surface 322 is arranged on an outer wall surface of an end, close to the main body 1, of the each spring claw 32, and a second positioning surface 13 cooperating with the first positioning surface 322 is formed on an inner wall of the main body 1.

Specifically, in the direction from the chuck rod 31 to the spring claw 32, the first positioning surface 322 is obliquely arranged in the direction away from the central axis of the chuck rod 31. The first positioning surface 322 is obliquely arranged in the direction away from the central axis of the chuck rod 31, so that during the clamping of the spring claw 32, a force on a contact surface of the main body 1 and the spring claw 32 is uniform, so as to ensure a clamping accuracy of the main body 1 for the spring chuck 2.

In some embodiments, a snap spring 7 is further sleeved on the end, away from the main body 1, of the locking cap 2. A steel wire spring 8 is further sleeved between the main body 1 and the outer sleeve 5. Through the arrangement of the snap spring 7 and the steel wire spring 8, components such as the main body 1 and the locking cap 2 are axially limited in the outer sleeve 5 to form a whole clamping mechanism.

Embodiment 2

Referring to FIG. 1 to FIG. 8, the embodiment provides an electric tool, including a main machine, a clamping piece and the clamping mechanism.

The main machine and the clamping piece are connected through the clamping mechanism. The clamping piece may be, for example, an electric grinding head.

The specific structure and implementation principle of the clamping mechanism provided in this embodiment are the same as those provided in Embodiment 1, and may bring the same or similar technical effects, which will not be elaborated herein and may refer to the description of Embodiment 1 for details.

It is to be noted that relational terms "first", "second" and the like herein are adopted only to distinguish one entity or operation from another entity or operation and not always to require or imply existence of any such practical relationship or sequence between the entities or operations. Furthermore, terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The above is only the specific implementation of the present disclosure, which causes those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments shown herein, but is within the widest scope consistent with the principles and novel features disclosed herein.

INDUSTRIAL APPLICABILITY

Some embodiments of the present disclosure provide a clamping mechanism and an electric tool, which avoid the problem of potential safety hazards caused by the fact that the clamping becomes loose during operation of the clamping mechanism, and have strong industrial applicability.

What is claimed is:

1. A clamping mechanism, comprising a main body, a locking cap, a spring chuck and an outer sleeve which is sleeved on a periphery of the locking cap and is configured to drive the locking cap to rotate;
the spring chuck comprises at least two spring claws which are circumferentially arranged to form a clamping claw hole; the locking cap is connected with the main body, and the locking cap is able to move in a direction close to the main body, so that the at least two spring claws are close to each other under a pressing action of an inner wall of the locking cap to achieve clamping, or move in a direction away from the main body, so that the spring claws are loosened;
a ring piece is arranged at an end, close to the main body, of the locking cap, and an elastic piece is arranged between the ring piece and the locking cap; a first groove is arranged on an inner wall of the outer sleeve, and a cam block cooperating with the first groove is arranged on the ring piece; and when the cam block is rotated into the first groove, the ring piece cooperates with the main body under an action of the elastic piece, so as to limit a rotation of the locking cap relative to the main body in the direction away from the main body when the spring claws are clamped, and when the cam block is moved out of the first groove, the ring piece is disengaged from the main body.

2. The clamping mechanism according to claim 1, wherein a first locking part is formed on the ring piece, a second locking part is formed on the main body, and the second locking part is configured to cooperate with the first locking part to limit the rotation of the locking cap relative to the main body in the direction away from the main body in the clamping state of the spring claws.

3. The clamping mechanism according to claim 2, wherein a ratchet is arranged on the ring piece, the ratchet is formed as the first locking part, and the second locking part is engaging teeth arranged on the main body and configured to engage with the ratchet.

4. The clamping mechanism according to claim 3, wherein a second groove is further arranged on the inner wall of the outer sleeve, the second groove is adjacent to the first groove, a groove depth of the second groove is less than a groove depth of the first groove, when the cam block is rotated from the second groove into the first groove, the ratchet is engaged with the engaging teeth, and when the cam block is rotated from the first groove into the second groove, the ratchet is disengaged from the engaging teeth.

5. The clamping mechanism according to claim 1, wherein at least one first driving part is arranged on the outer sleeve, at least one second driving part is arranged on the locking cap, and the at least one first driving part is in driving connection with the at least one second driving part correspondingly to drive the locking cap to rotate when rotating the outer sleeve.

6. The clamping mechanism according to claim 5, wherein the at least one first driving part is a driving strip, the at least one second driving part is a driving groove, the driving strip is able to extend into the driving groove and is in clearance fit with the driving groove, and a gap corresponds to an angle at which the ring piece is rotated from being combined with the main body to being disengaged from the main body relative to the outer sleeve.

7. The clamping mechanism according to claim 6, wherein at least two first driving parts are provided, the at least two first driving parts are arranged at intervals in a circumferential direction of the inner wall of the outer sleeve, and the first groove and a second groove are located between two adjacent first driving parts.

8. The clamping mechanism according to claim 1, wherein first clamping parts are arranged on an inner wall of the ring piece, and second clamping parts configured to cooperate with the first clamping parts are arranged on the locking cap, so that the ring piece and the locking cap are relatively fixed in a circumferential direction and may relatively move in an axial direction.

9. The clamping mechanism according to claim 1, wherein a first conical surface is arranged on an outer wall surface of an end, close to the locking cap, of each spring claw, and a second conical surface cooperating with the first conical surface is formed on the inner wall of the locking cap.

10. The clamping mechanism according to claim 1, wherein a first positioning surface is arranged on an outer wall surface of an end, close to the main body, of each spring claw, and a second positioning surface cooperating with the first positioning surface is formed on an inner wall of the main body.

11. The clamping mechanism according to claim 1, wherein a first thread is arranged on an outer wall of the main body, a second thread engaged with the first thread is arranged on the inner wall of the locking cap, and the main body and the locking cap are connected through an engagement between the first thread and the second thread.

12. An electric tool, comprising a main machine, a clamping piece and the clamping mechanism according to claim 1, the main machine and the clamping piece being connected through the clamping mechanism.

13. The electric tool according to claim 12, wherein a first locking part is formed on the ring piece, a second locking part is formed on the main body, and the second locking part is configured to cooperate with the first locking part to limit the rotation of the locking cap relative to the main body in the direction away from the main body in the clamping state of the spring claws.

14. The electric tool according to claim 13, wherein a ratchet is arranged on the ring piece, the ratchet is formed as the first locking part, and the second locking part is engaging teeth arranged on the main body and configured to engage with the ratchet.

15. The electric tool according to claim 14, wherein a second groove is further arranged on the inner wall of the outer sleeve, the second groove is adjacent to the first groove, a groove depth of the second groove is less than a groove depth of the first groove, when the cam block is rotated from the second groove into the first groove, the ratchet is engaged with the engaging teeth, and when the cam block is rotated from the first groove into the second groove, the ratchet is disengaged from the engaging teeth.

16. The electric tool according to claim 12, wherein at least one first driving part is arranged on the outer sleeve, at least one second driving part is arranged on the locking cap, and the at least one first driving part is in driving connection with the at least one second driving part correspondingly to drive the locking cap to rotate when rotating the outer sleeve.

17. The electric tool according to claim 16, wherein the at least one first driving part is a driving strip, the at least one second driving part is a driving groove, the driving strip is able to extend into the driving groove and is in clearance fit with the driving groove, and a gap corresponds to an angle at which the ring piece is rotated from being combined with the main body to being disengaged from the main body relative to the outer sleeve.

18. The electric tool according to claim 17, wherein at least two first driving parts are provided, the at least two first driving parts are arranged at intervals in a circumferential direction of the inner wall of the outer sleeve, and the first groove and a second groove are located between two adjacent first driving parts.

19. The electric tool according to claim 12, wherein first clamping parts are arranged on an inner wall of the ring piece, and second clamping parts configured to cooperate with the first clamping parts are arranged on the locking cap, so that the ring piece and the locking cap are relatively fixed in a circumferential direction and may relatively move in an axial direction.

20. The electric tool according to claim 12, wherein a first conical surface is arranged on an outer wall surface of an end, close to the locking cap, of each spring claw, and a second conical surface cooperating with the first conical surface is formed on the inner wall of the locking cap.

* * * * *